United States Patent
Hofhansl et al.

(10) Patent No.: US 9,348,576 B2
(45) Date of Patent: May 24, 2016

(54) METHODS AND SYSTEMS FOR UPGRADING AND INSTALLING APPLICATION PACKAGES TO AN APPLICATION PLATFORM

(71) Applicant: salesforce.com, inc., San Francisco, CA (US)

(72) Inventors: Lars Hofhansl, Orinda, CA (US); Nathan Jensen-Horne, Walnut Creek, CA (US); Scott Hansma, Burlingame, CA (US); Steven Tamm, San Francisco, CA (US); Craig Weissman, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 14/094,738

(22) Filed: Dec. 2, 2013

(65) Prior Publication Data

US 2014/0173582 A1 Jun. 19, 2014

Related U.S. Application Data

(62) Division of application No. 11/866,911, filed on Oct. 3, 2007, now Pat. No. 8,601,467.

(60) Provisional application No. 60/828,016, filed on Oct. 3, 2006.

(51) Int. Cl.
    *G06F 9/44* (2006.01)
    *G06F 9/445* (2006.01)

(52) U.S. Cl.
    CPC .. *G06F 8/65* (2013.01); *G06F 8/60* (2013.01); *G06F 8/61* (2013.01); *G06F 8/71* (2013.01)

(58) Field of Classification Search
    CPC ............... G06F 8/30; G06F 8/61; G06F 8/36; G06F 8/65; G06F 8/60; G06F 8/71
    See application file for complete search history.

(56) References Cited

U.S. PATENT DOCUMENTS 5,577,188 A 11/1996 Zhu
5,608,872 A 3/1997 Schwartz et al.
(Continued)

FOREIGN PATENT DOCUMENTS

WO 2008042984 A2 4/2008

OTHER PUBLICATIONS

Shwartz et al., IT Service Provider's Multi-Customer and Multi-Tenant Environments, 2007, 8 pages.*

(Continued)

*Primary Examiner* — Thuy Dao

(74) *Attorney, Agent, or Firm* — Haynes Beffel & Wolfeld LLP; Ernest J. Beffel, Jr.

(57) ABSTRACT

Systems and methods for installing and upgrading application packages to an application platform. Application packages may be uploaded to a directory by developing users (developers) for installation by subscribing users (subscribers). Alternatively, a developer may send identification information to a subscribing user to allow that user to access and install that application package created by the developer. Application packages may also be upgraded. If a developer changes the original source package, a subscriber can choose to pull into their organization the change(s) made by the publisher while preserving any data rows the subscriber had created since first importing the package.

20 Claims, 2 Drawing Sheets

(56) References Cited

U.S. PATENT DOCUMENTS

| | | |
|---|---|---|
| 5,649,104 A | 7/1997 | Carleton et al. |
| 5,715,403 A | 2/1998 | Stefik |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,567,107 B1 | 5/2003 | Stannard |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,789,215 B1 | 9/2004 | Rupp et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,983,371 B1 | 1/2006 | Hurtado et al. |
| 7,003,767 B2 | 2/2006 | Larkin |
| 7,062,502 B1 | 6/2006 | Kesler |
| 7,069,231 B1 | 6/2006 | Cinarkaya et al. |
| 7,069,293 B2 | 6/2006 | Cox et al. |
| 7,069,497 B1 | 6/2006 | Desai |
| 7,181,758 B1 | 2/2007 | Chan |
| 7,210,143 B2 | 4/2007 | Or et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,392,522 B2 * | 6/2008 | Murray ............... G06F 9/44526 717/174 |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,765,540 B2 | 7/2010 | McCollum et al. |
| 7,774,366 B2 | 8/2010 | Fisher et al. |
| 7,779,039 B2 | 8/2010 | Weissman et al. |
| 7,779,475 B2 | 8/2010 | Jakobson et al. |
| 7,851,004 B2 | 12/2010 | Hirao et al. |
| 7,856,631 B2 | 12/2010 | Brodkorb et al. |
| 7,865,888 B1 | 1/2011 | Qureshi et al. |
| 7,949,684 B2 | 5/2011 | Brooks et al. |
| 7,996,814 B1 | 8/2011 | Qureshi et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,060,855 B2 * | 11/2011 | Hegde ................. G06F 8/71 715/751 |
| 8,060,871 B2 | 11/2011 | Bernabeu-Auban et al. |
| 8,065,594 B2 | 11/2011 | Limberg |
| 8,069,184 B2 * | 11/2011 | Becker ............. G06F 17/30321 707/705 |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,176,484 B2 | 5/2012 | Sero et al. |
| 8,209,308 B2 | 6/2012 | Rueben et al. |
| 8,209,333 B2 | 6/2012 | Hubbard et al. |
| 8,245,221 B2 * | 8/2012 | Czeisler .................. H04L 67/34 709/200 |
| 8,255,362 B2 * | 8/2012 | Johnson .................... G06F 8/65 707/625 |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,601,467 B2 * | 12/2013 | Hofhansl .................. G06F 8/60 717/120 |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0133392 A1 | 9/2002 | Angel et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2002/0184618 A1 | 12/2002 | Bala et al. |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |

(56) References Cited

U.S. PATENT DOCUMENTS

| | | |
|---|---|---|
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0003266 A1 | 1/2004 | Moshir et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0068721 A1 | 4/2004 | O'Neill et al. |
| 2004/0107125 A1 | 6/2004 | Guheen et al. |
| 2004/0128001 A1 | 7/2004 | Levin et al. |
| 2004/0153416 A1 | 8/2004 | Fujimoto |
| 2004/0181773 A1* | 9/2004 | Mortensen ............... G06F 8/71 717/101 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0267590 A1 | 12/2004 | Clark et al. |
| 2004/0268299 A1 | 12/2004 | Lei et al. |
| 2005/0049973 A1 | 3/2005 | Read et al. |
| 2005/0050555 A1 | 3/2005 | Exley et al. |
| 2005/0055687 A1* | 3/2005 | Mayer ............................ 717/173 |
| 2005/0065925 A1 | 3/2005 | Weissman et al. |
| 2005/0091098 A1 | 4/2005 | Brodersen et al. |
| 2005/0223022 A1 | 10/2005 | Weissman et al. |
| 2006/0021019 A1 | 1/2006 | Hinton et al. |
| 2006/0021065 A1 | 1/2006 | Kamperman et al. |
| 2006/0031547 A1 | 2/2006 | Tsui et al. |
| 2006/0123414 A1 | 6/2006 | Fors et al. |
| 2006/0206449 A1* | 9/2006 | Fletcher et al. ................... 707/1 |
| 2006/0206834 A1 | 9/2006 | Fisher et al. |
| 2006/0235715 A1 | 10/2006 | Abrams et al. |
| 2006/0282440 A1* | 12/2006 | Fletcher et al. ............... 707/100 |
| 2007/0038489 A1 | 2/2007 | Kayahara et al. |
| 2007/0088741 A1 | 4/2007 | Brooks et al. |
| 2007/0169081 A1* | 7/2007 | Zhao et al. .................... 717/168 |
| 2008/0249972 A1 | 10/2008 | Dillon |
| 2009/0007162 A1* | 1/2009 | Sheehan ....................... 719/331 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0197287 A1 | 8/2011 | Hess et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0247216 A1 | 9/2013 | Cinarkaya et al. |

OTHER PUBLICATIONS

Santinelli et al., Installing and configuring application software on the LHC computing grid, 2005, 8 pages.*
Guo et al., A Framework for Native Multi-Tenancy Application Development and Management, 2007, 8 pages.*
Pechtchanski et al., Immutability specification and its applications, Nov. 2010, 10 pages.
Tschantz et al., Javari: adding reference immutability to Java, Oct. 2005, 20 pages.
Gummadi et al., Measurement, modeling, and analysis of a peer-to-peer file-sharing workload, Dec. 2003, 16 pages.
International Search Report mailed on Nov. 26, 2007, for PCT Application No. PCT/US06/35207 filed on Sep. 8, 2006, one page.
U.S. Appl. No. 11/866,898, filed Oct. 3, 2007, for Ron Hess et al.
Final Office Action, U.S. Appl. No. 13/016,941 (non HBW), dated Jun. 21, 2012, 19 pages.
Non-Final Office Action, U.S. Appl. No. 13/016,941 (non HBW), dated Mar. 9, 2012, 15 pages.
Final Office Action, U.S. Appl. No. 11/866,898 (non HBW), dated Sep. 12, 2011, 27 pages.
Non Final Office Action, U.S. Appl. No. 11/866,898 (non HBW), dated Feb. 23, 2011, 36 pages.
Non Final Office Action, U.S. Appl. No. 11/866,898 (non HBW), dated Oct. 8, 2014, 23 pages.

* cited by examiner

METHODS AND SYSTEMS FOR UPGRADING AND INSTALLING APPLICATION PACKAGES TO AN APPLICATION PLATFORM

CROSS-REFERENCES TO RELATED APPLICATIONS

The present application claims priority from and is a divisional application of U.S. application Ser. No. 11/866,911 entitled "METHODS AND SYSTEMS FOR UPGRADING AND INSTALLING APPLICATION PACKAGES TO AN APPLICATION PLATFORM" filed Oct. 3, 2007, which is a non-provisional of U.S. Provisional Application Ser. No. 60/828,016, entitled "METHOD AND SYSTEM FOR INSTALLING APPLICATION PACKAGES TO AN APPLICATION PLATFORM" filed Oct. 3, 2006, the entire disclosure of which is incorporated by reference for all purposes.

FIELD

The present invention relates generally to database systems, and more particularly to systems and methods for installing application packages to an application platform and upgrading installed applications.

BACKGROUND

Application packaging functionality in an on-demand database system was previously introduced to support exchanging customizations from one organization (org) to another. However, in early releases, limited support for customizations involving standard objects and page layouts was provided. For example, previously, there was limited or no ability to add custom fields to standard objects such as Accounts, Contacts, or Opportunities. In addition, there was no distinction between objects installed from the application exchange directory and those created manually by customers in a subscribing organization. All objects could be modified at will by the administrators in the subscribing organization. This aspect opens up the possibility that changes to components of an Application could break integrations with external services or controls. Finally, there were limited facilities provided to support future upgrades to the components installed as part of a partner application.

Therefore it is desirable to provide systems and methods that overcome the above and other problems. In particular, it is desirable to provide systems and methods that: ensure that all packages downloaded from an application directory can be successfully installed to a subscribing organization, even if they have components named the same as other components in the subscriber organization; enable developers/publishers to publish or reference anything they can create manually; ensure that key integration points and business process automation logic cannot be broken by the local administrators; and/or enable developers/publishers to provide updates to applications which have been installed by various users/subscribers.

BRIEF SUMMARY

The present invention provides systems and methods for installing application packages to an application platform and upgrading installed application packages. The systems and methods are particularly useful in an on-demand database service.

In certain aspects, systems and methods are provided that: ensure that all packages downloaded from an application directory can be successfully installed to a subscribing organization, even if they have components named the same as other components in the subscriber organization; enable developers/publishers to publish or reference anything they can create manually; ensure that key integration points and business process automation logic cannot be broken by the local administrators; and/or enable developers/publishers to provide updates to applications which have been installed by various users/subscribers.

In certain aspects, application packages may be uploaded to a directory by developing users (developers) for installation by subscribing users (subscribers). Alternatively, a developer may send identification information to a subscribing user to allow that user to access and install that application package created by the developer. Application packages may also be upgraded. For example, if a developer/export user changes the original source package, a subscriber can choose to pull into their organization the change(s) made by the publisher while preserving any data rows the subscriber had created since first importing the package. According to certain aspects, one or more flags may be set in the package definition to determine whether and to what extent customizations to a package may be made and upgraded by the subscriber and/or developer. In one aspect, a "manageable" field is provided to identify whether customizations to a particular object are subject to upgrade. For example, if the package or an object in the package is marked as managed, a user is allowed to customize the package or the object, and these customizations will not be altered upon upgrading of the package. In another aspect, a "control" field is provided to identify whether an object may be modified by the developer and/or the subscriber. In another aspect, an "immutable" field is provided to identify whether an object can or cannot be altered by anyone. For example, the developer can set the immutable flag so that nobody is able to modify the packages after it has been published. An upgrade process that executes checks each of these fields, where present, to determine the extent that customizations are maintained upon upgrading.

According to one aspect, a method is provided for installing application packages to an application platform managed by an on-demand database service. The method typically includes indicating, by a developer (publisher) of an application package, that the developer will allow a license manager that tracks applications on behalf of at least one developer, to track what versions of the application package the developer has uploaded and what versions a set of subscribers currently have installed, and permitting the license manager to inform at least one of the set of subscribers of a new update to the application package when the developer uploads the new update. In certain aspects, the method includes not applying changes made by the developer to a custom object having metadata indicating that the custom object is an "immutable" object to identify that the custom object cannot be altered by anyone. In certain aspects, the method includes restricting at least one of the developer and the subscriber from modifying a custom object having metadata indicating that the custom object is a "managed" object to identify that the custom object can be customized by the developer and the subscriber, thereby avoiding conflicting changes to respective versions of the metadata of the developer and the subscriber.

According to one aspect, a method is provided for installing application packages to an application platform managed by an on-demand database service. The method typically includes indicating, by a developer (publisher) of an application package, that the developer will allow a license manager that tracks applications on behalf of at least one developer to track what versions of the application package the developer has uploaded and what versions a set of subscribers currently have installed. The method also typically includes permitting the license manager to inform at least one of the set of subscribers of a new update to the application package when the developer uploads the new update.

According to another aspect, a method is provided for upgrading application packages installed to an application platform and managed by an on-demand database service. the method typically includes storing an uploaded application package at a directory that is accessible by a plurality of subscribers, the application package being created by a developer and including a set of metadata components. the method also typically includes responsive to receiving from a first subscriber a selection of the application package, installing the application package to the first subscriber, receiving, from the developer, a new version of the uploaded application package at the directory, storing the new version, wherein the stored new version includes only a) any new metadata component or components relative to a prior version and/or b) any changes to a metadata component of a prior version. The method also typically includes informing the first subscriber of the new version of the application package, and responsive to receiving from a subscriber a selection of the new version, installing the new version to the subscriber.

According to yet another aspect, a computer-readable medium storing computer code for controlling one or more processor components to manage installation of application packages to an application platform in an on-demand database service is provided. The code typically includes instructions to receive an indication by a developer of an application package that the developer will allow a license manager that tracks applications on behalf of at least one developer to track what versions of the application package the developer has uploaded and what versions a set of subscribers currently have installed, and permit the license manager to inform at least one of the set of subscribers of a new update to the application package when the developer uploads the new update.

According to another aspect, a computer-readable medium storing computer code for controlling one or more processor components to manage installation and upgrading of application packages to an application platform in an on-demand database service is provided. The code typically includes instructions to store an uploaded application package at a directory that is accessible by a plurality of subscribers, the application package being created by a developer and including a set of metadata components, and responsive to receiving from a first subscriber a selection of the application package, install the application package to the first subscriber. The code also typically includes instructions to, responsive to receiving from the developer a new version of the uploaded application package, store the new version to the directory, wherein the stored new version includes only a) any new metadata component or components relative to a prior version and b) any changes to a metadata component of a prior version. The code also typically includes instructions to automatically inform the first subscriber of the new version of the application package, and responsive to receiving from a subscriber a selection of the new version, install the new version to that subscriber.

According to yet another aspect, a system is provided for managing installation and upgrades of application packages installed to an application platform in an on-demand database service. The system typically includes a database system for storing metadata components, and one or more processors configured to store an uploaded application package to a directory portion of the database that is accessible by a plurality of subscribers, the application package including a set of metadata components created and uploaded to the directory by a developer. The processors are also typically configured to, responsive to receiving from a first subscriber a selection of the application package, install the application package to the first subscriber, and responsive to receiving from the developer a new version of the uploaded application package, store the new version to the directory, wherein the stored new version includes only a) any new metadata component or components relative to a prior version and/or b) any changes to a metadata component of a prior version. The processors are also typically configured to automatically inform the first subscriber of the new version of the application package, and responsive to receiving from a subscriber a selection of the new version, install the new version to that subscriber.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION OF THE INVENTION

The present invention provides systems and methods for installing application packages to an application platform and upgrading installed application packages. The systems and methods are particularly useful in an on-demand database service.

System Overview

Figure 1:
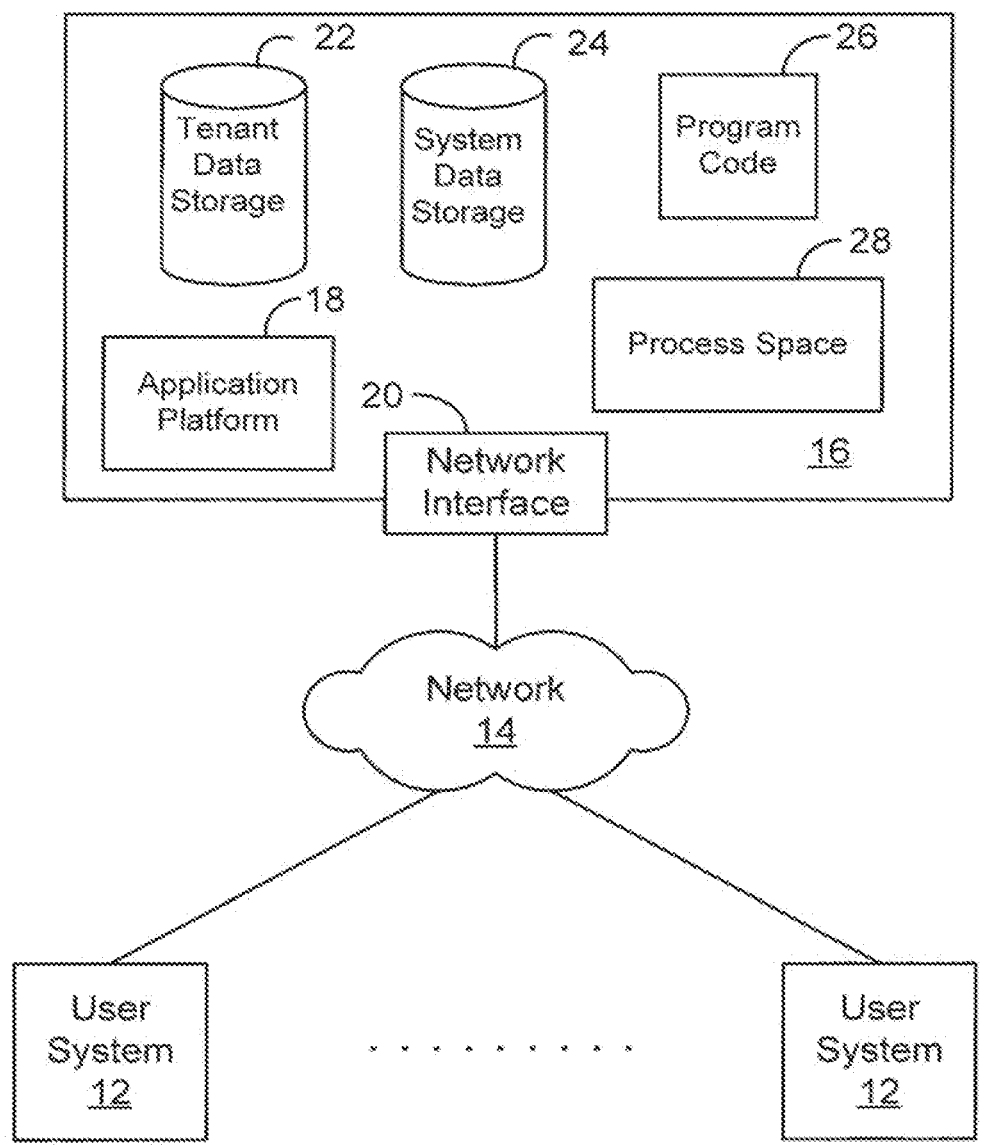
FIG. 1 illustrates an environment wherein an on-demand database service might be used.

FIG. 1 illustrates an environment wherein an on-demand database service might be used. As illustrated in FIG. 1 (and in more detail in FIG. 2) user systems 12 might interact via a network 14 with an on-demand database service 16. Some on-demand database services may store information from one or more tenants stored into tables of a common database image to form a multi-tenant database system (MTS). Accordingly, on-demand database service 16 and system 16 will be used interchangeably herein. A database image may include one or more database objects. A relational database management system (RDMS) or the equivalent may execute storage and retrieval of information against the database object(s). Some on-demand database services may include an application platform 18 that enables creation, managing and executing one or more applications developed by the provider of the on-demand database service, users accessing the on-demand database service via user systems 12, or third party application developers accessing the on-demand database service via user systems 12.

The users of those user systems 12 might be users in differing capacities, and the capacity of a particular user system 12 might be entirely determined by permissions (permission levels) for the current user. For example, where a salesperson is using a particular user system 12 to interact with System 16, that user system has the capacities allotted to that salesperson. However, while an administrator is using that user system to interact with System 16, that user system has the capacities allotted to that administrator. In systems with an hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 can be a LAN (local area network), WAN (wide area network), wireless network, point-to-point network, star network, token ring network, hub network, or other appropriate configuration. As the most common type of network in current use is a TCP/IP (Transfer Control Protocol and Internet Protocol) network such as the global internetwork of networks often referred to as the "Internet" with a capital "I," that will be used in many of the examples herein. However, it should be understood that the networks that the present invention might use are not so limited, although TCPIIP is a frequently implemented protocol.

User systems 12 might communicate with System 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at System 16. Such HTTP server might be implemented as the sole network interface between System 16 and network 14, but other techniques might be used as well or instead. In some implementations, the interface between System 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations are contemplated.

In one aspect, the system shown in FIG. 1 implements a web-based customer relationship management (CRM) system. For example, in one aspect, System 16 includes application servers configured to implement and execute CRM software applications as well as provide related data, code, forms, Web pages and other information to and from user systems 12 and to store to, and retrieve from, a database system related data, objects and Web page content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain aspects, system 16 implements applications other than, or in addition to, a CRM application. For example, system 16 may provide tenant access to multiple hosted (standard and custom) applications, including a CRM application. User (or third party developer) applications, which mayor may not include CRM, may be supported by the application platform 18, which manages creation, storage of the applications into one or more database objects and executing of the applications in a virtual machine in the process space of the system 16. Their components might be operator configurable using application(s) including computer code run using a central processing unit such as an Intel Pentium® processor or the like, or multiple processor units. A computer program product aspect includes a machine-readable storage medium (media) having instructions stored thereon/in which can be used to program a computer to perform any of the processes of the embodiments described herein. Computer code for operating and configuring System 16 to intercommunicate and to process web pages, applications and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCPIIP, HTTP, HTTPS, Ethernet, etc.) as are well known. It will also be appreciated that computer code for implementing aspects of the present invention can be implemented in any programming language that can be executed on a client system and/or server or server system such as, for example, in C, C++, HTML, any other markup language, Java™, JavaScript, ActiveX, any other scripting language such as VBScript, and many other programming languages as are well known. (Java™ is a trademark of Sun Microsystems, Inc.).

According to one embodiment, each System 16 is configured to provide web pages, forms, applications, data and media content to user (client) systems 12 to support the access by user systems 12 as tenants of System 16. As such, System 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations.

One arrangement for elements of System 16 is shown in FIG. 1, including a network interface 20, application platform 18, storage 22 for tenant data, storage 24 for system data accessible to System 16 and possibly multiple tenants, program code 26 for implementing various functions of System 16, and a process space 28 for executing MTS system processes and tenant-specific processes, such as running applications as part of an application hosting service. Additional processes that may execute on System 16 include database indexing processes.

Several elements in the system shown in FIG. 1 include conventional, well-known elements that need not be explained in detail here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from System 16 over network 14. Each user system 12 also typically includes one or more user interface devices, such as a keyboard, a mouse, touch screen, pen or the like, for interacting with a graphical user interface (GUI) provided by the browser on a display (e.g., monitor screen, LCD display, etc.) in conjunction with pages, forms, applications and other information provided by System 16 or other systems or servers. For example, the user interface device can be used to access data and applications hosted by System 16, and to perform searches on stored data, and otherwise allow a user to interact with various GUI pages that may be presented to a user.

As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as art Intel Pentium® processor or the like. Similarly, System 16 (and additional instances of an MTS, where more than one is present) and all of Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
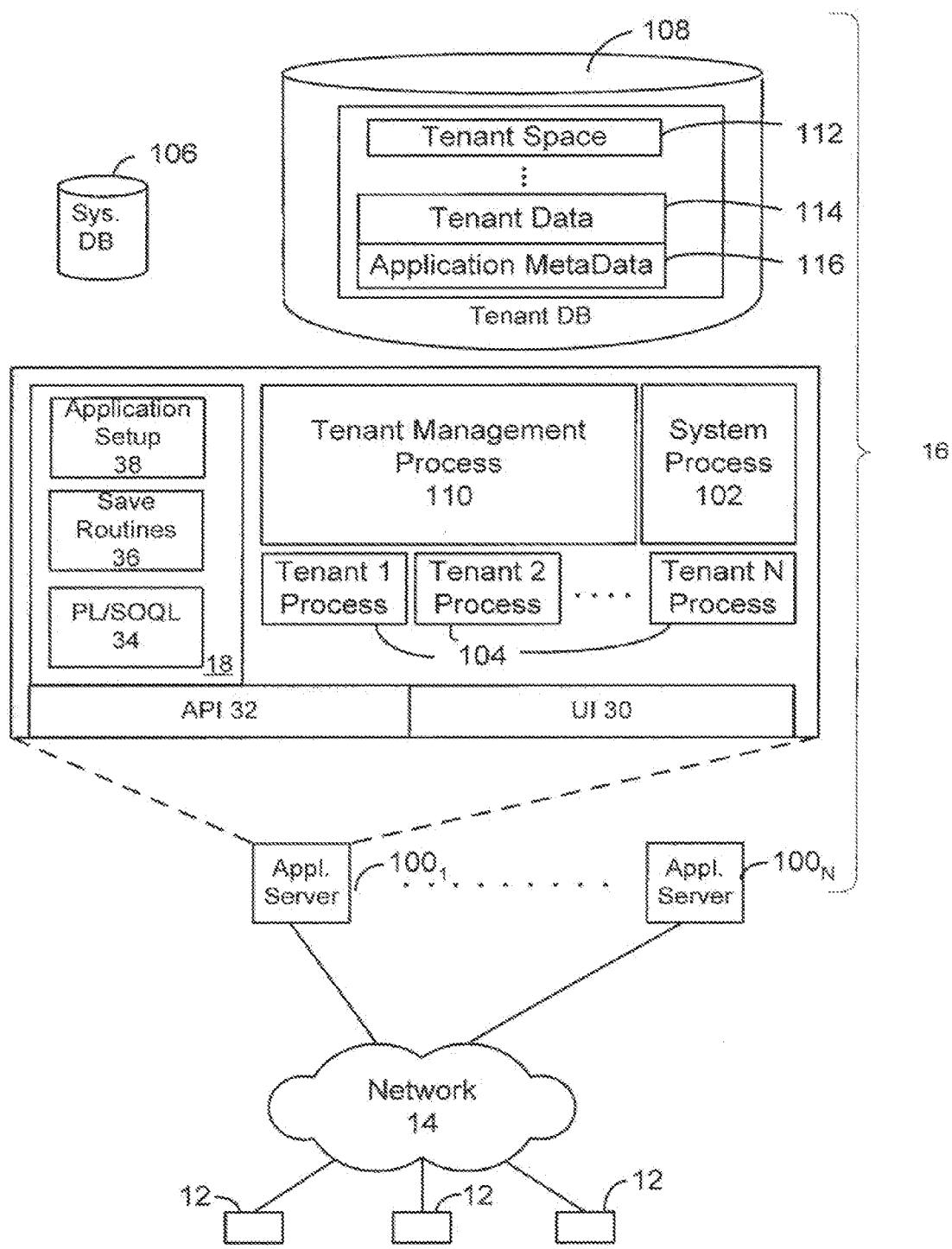
FIG. 2 illustrates elements of an example System and various interconnections in an embodiment.

FIG. 2 illustrates elements of an example System 16 and various interconnections in an embodiment. As shown by FIG. 2, example System 16 includes a network interface 20 (of FIG. 1) implemented as one or more HTTP application servers 100, an application platform 18 and database objects 106, 108. Also shown is system process space 102, including individual tenant process spaces 104, a tenant management process space 110 and database objects 106, 108. A Tenant database 108 might be divided into individual tenant storage areas 112, which can be either a physical arrangement or a logical arrangement. Within each tenant storage area 112, user storage 114 and application storage 116 might similarly be allocated for each user. For example, a copy of a user's most recently used (MRU) items might be stored to user storage area 114. Similarly, a copy of MRU items for an entire organization that is a tenant might be stored to tenant storage area 112. A user interface UI 30 provides a user interface and an API 32 provides an application programmer interface to System 16 resident processes to users and/or developers at user systems 12.

Application platform 18 includes an application setup mechanism 38 that supports application developers' creation and management of applications, which may be saved as metadata into tenant database 108 by save routines 36 for execution by subscribers as one or more tenant processes 104 managed by tenant management process 110 for example. Invocations to such applications may be coded using Apex 34 that provides a programming language style interface extension to API 32. Invocations to applications may be detected by one or more system processes, which manages retrieving application metadata 116 for the subscriber making the invocation and executing the metadata as an application in a virtual machine.

It should also be understood that each application server 100 may be communicably coupled to database systems, e.g., system database 106 and tenant database(s) 108, via a different network connection. For example, one server 1001 might be coupled via the Internet 14, another server 100N-1 might be coupled via a direct network link, and another server 100N might be coupled by yet a different network connection. Transfer Control Protocol and Internet Protocol (TCP/IP) are typical protocols for communicating between servers 100 and the database system; however, it will be apparent to one skilled in the art that other transport protocols may be used to optimize the system depending on the network interconnect used.

In certain aspects, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the servers 100 and the user systems 12 to distribute requests to the servers 100. In one aspect, the load balancer uses a least connections algorithm to route user requests to the servers 100. Other examples of load balancing algorithms, such as round robin and observed response time, also can be used. For example, in certain aspects, three consecutive requests from the same user could hit three different servers 100, and three requests from different users could hit the same server 100. In this manner, System 16 is multi-tenant, wherein System 16 handles storage of, and access to, different objects, data and applications across disparate users and organizations.

As an example of storage, one tenant might be a company that employs a sales force where each salesperson uses System 16 to manage their sales process. Thus, a user might maintain contact data, leads data, customer follow-up data, performance data, goals and progress data, etc., all applicable to that user's personal sales process (e.g., in tenant database 108). In an example MTS arrangement, since all of this data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by System 16 that are allocated at the tenant level while other data structures might be managed at the user level. Because an MTS might support multiple tenants including possible competitors, the MTS should have security protocols that keep data, applications, and application use separate. Also, because many tenants will opt for access to an MTS rather than maintain their own system, redundancy, uptime, and backup are additional critical functions and need to be implemented in the MTS.

In addition to user-specific data and tenant-specific data, System 16 might also maintain system level data usable by multiple tenants or other data. Such system level data might include industry reports, news, postings, and the like that are sharable among tenants.

In certain aspects, client systems 12 communicate with application servers 100 to request and update system-level and tenant-level data from System 16 that may require one or more queries to database system 106 and/or database system 108. System 16 (e.g., an application server 100 in System 16) automatically generates one or more SQL statements (the SQL query) designed to access the desired information. Database system 108 may generate query plans to access the requested data from the database.

Each database can generally be viewed as a collection of objects, such as a set of logical tables, containing data fitted into predefined categories. A "table" is one representation of a data object, and is used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead and Opportunity data, each containing pre-defined fields. It should be understood that "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain aspects, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Creating and Exchanging Application Packages

In one embodiment, users have the ability to create, post and exchange applications. As used herein, in one aspect, an application is a group or package of multi-tenant database setup data (e.g., metadata) that defines its data model, user interface and business logic. For example, in one aspect a user/developer may define a tab set, which logically defines the group of metadata that makes up an application. A tab represents a user interface into an element of an application or into a database object. Selection of a tab provides a user access to the object or element of the application represented by the tab. A tab set is a group of related tabs that work as a unit to provide application functionality. New tabs and tab sets may be defined and tab set views may be customized so that an end user can easily and conveniently switch between the various objects and application elements represented by the defined tabs and tab sets. In one aspect, for example, tabs and tab sets may be used as a means to switch between applications in a multiple application environment, such as an on demand web-based hosted application environment. U.S. patent application Ser. No. 11/075,546, filed Mar. 8, 2005, titled "Systems and Methods for Implementing MultiApplication Tabs and Tab Sets", which is hereby incorporated by reference, discusses various aspects and details of tabs and tabs sets.

As used herein, a "package" is a metadata object that references the set of metadata objects used in an application in an organization. A "package" is or includes, in certain aspects, a collection of metadata components. A package can also include code (e.g., Apex, javascript, etc. or formulas) and files (e.g., Word documents or other file types). As used herein, an "organization" can mean a single tenant in a multi-tenant system and/or a set of metadata (both application data and metadata) for a single tenant in a multi-tenant system.

In one embodiment, a user/developer can precisely define a metadata "package" which includes all setup data (e.g., custom object definitions, page layout definitions, workflow rules, etc.) that make up an application. A package may include 0, 1 or more tab sets. The user can then export this package from one "source" organization to a "container" organization that is not associated with any tenant in the database system. An exported package is registered with or listed in an application directory. A user that creates and/or exports a package will be referred to herein as a source user or exporting user or a developer. The source user can choose to have the package name and application listed in a public portion of the application directory. Another user can import the package into a separate "target" organization allowing this organization to use the application independently of the developer organization. A user that views and/or imports a package will be referred to herein as a viewing user or importing user or a subscriber.

In one aspect, the application directory includes a public portion that includes published packages intended for use by anyone, and a private portion that includes packages not intended for general use (e.g., packages intended for use by import users as selected by the source user). The directory allows other users to browse published applications and choose which ones they want to install into their organization. In one aspect, the central directory is organized by a category hierarchy that allows users to search and browse by category for the types of application they're interested in.

In certain aspects, the directory is built using JSP pages, JSTL, a JSP tag library, JSP tags, and Java classes. In one aspect, data used by the directory is stored in an organization object managed by one or more directory administrators. Developers of applications may use the directory to input and maintain descriptive information held in a DirectoryEntry object for each application. Directory entries have an associated status field and only applications having a status of "published" or "public" are rendered for a visitor. A status of "preview" allows developers and directory administrators to see results as they will appear on the web before they become public.

Additional aspects and details of a package creation process, an application package export process and an application directory can be found in U.S. patent application Ser. No. 11/530,394 filed Sep. 8, 2006, titled "Systems and Methods for Exporting, Publishing, Browsing and Installing On-Demand Applications In A Multi-Tenant Database", which is hereby incorporated by reference.

Package Installation and Upgrading

To import and install a package into an organization, an import user (subscriber) navigates to the URL that was generated by the package export process, either through the directory, or via a message from the developer. This URL contains a unique key that identifies a particular exported application and package. The import user may have found this URL by browsing the public directory, or an exporting user may have simply emailed the URL to that user. When the subscriber clicks on the URL they are able to access, view and import the package.

Upon selecting a package for import from the directory, for example, code on the server system takes the metadata from the container organization, selects the appropriate subscriber organization, reads the metadata from the container organization, and writes that metadata into the subscriber organization. Any conflicting metadata (e.g., object or field names) can be resolved by the importing user, e.g., by aborting or by renaming subscriber organization objects, fields, etc. It should be noted that the import process preferably does not overwrite any existing subscriber organization fields. Also, an import user can uninstall the imported application.

In one aspect, installation is a multi-step process with one or more steps performed using an installation wizard. For example, in one aspect, the steps include providing a display of the package contents for the user to examine and confirm they want to install, configuring the security for the existing profiles in the subscriber's organization, importing the package contents, and deploying the application to the intended users. An import user may also choose to customize items or components in the install package.

In certain aspects, some or all of the following steps may need to be performed or may occur during the package import and install process:

1) Log into the recipient organization by entering a UserID and Password. This is a user id for the recipient organization into which the package is to be imported.

2) Optionally, the exporter may have password protected the package. If this is the case, the import user has to enter the package password before they can import it (this is a different password than the user password required to log into the recipient organization).

3) If object names in the package conflict with setup data in the recipient organization, the import process may fail. The import user may change the object names on conflicting objects within the recipient organization and restart the import process.

4) During the import process, the recipient organization is locked to prevent inconsistent metadata updates.

5) The import process checks to make sure the importing user has appropriate organization permissions to import a package.

6) The import user may be asked to define mappings from source organization specific references in the package to values appropriate for the recipient organization. For example, the import user may be prompted to specify a user id, profile or role.

7) The setup data is copied into the subscriber organization in a "development" mode. This allows a subscriber to verify that the application functions correctly before deploying it to users within the subscriber organization.

8) The import process scans the package for malicious functionality. For example, it can check for any Web Integration Links (WILs) that may post data to third party websites.

If specified in the package definition, a subscriber is unable to change any of the setup data in the package after it is imported. For example, the import user cannot add or remove fields from a custom object after it is imported if specified in the package definition. This is implemented, in certain aspects, by the custom object edit screen functionality checking the package definition tables before allowing any edits to an object in the recipient organization.

A subscriber can optionally "uninstall" a package. This can be implemented because the system keeps track of which metadata objects belong to the package (e.g., through the package database schema).

In certain aspects, packages may be upgraded. For example, if a developer/export user changes the source package, the import user can choose to pull into their organization the change(s) made by the publisher while preserving any data rows the subscriber had created since first importing the package. According to certain aspects, one or more flags may be set in the package definition to determine whether and to what extent customizations to a package may be made and upgraded. In one aspect, a "manageable" field is provided to identify whether customizations to a particular object are subject to upgrade. For example, if the package or an object in the package is marked as managed, the user is allowed to customize the package or the object, and these customizations will not be altered upon upgrading of the package. In another aspect, a "control" field is provided to identify whether an object may be modified by the developer and/or the subscriber. In another aspect, an "immutable" field is provided to identify whether an object can or cannot be altered by anyone. For example, the developer can set the immutable flag so that nobody is able to modify the packages after it has been published. An upgrade process that executes checks each of these fields, where present, to determine the extent that customizations are maintained upon upgrading.

The upgrade model in certain aspects is a pull rather than a push paradigm. Pull is more forgiving: if an error occurs during the upgrade process, the administrator can manually address the problem and try again. Because of this leniency, guaranteed upgrades are not required. However, to implement automatic upgrades, in certain aspects, a framework for guaranteed upgrades is provided, so that upgrades can be automatically applied without failure and without human intervention. It should be noted that there are several different ways in which an upgrade to an application package could break down, including, for example the following:

Collisions: A new version of a package adds a custom object with the same name as an existing custom object in the subscribing organization.

Divergent changes: A new version of a package changes some attribute of a field, which has also been changed in the subscribing organization.

Destructive changes: A new version of a package removes a custom object or custom field, changes a custom field type, changes an API name, etc.

Resource limitations: A new version of a package adds 10 or more custom fields, and the subscribing organization is within 10 fields of the edition limit.

Permissions: A new version of a package requires an object such as Campaigns, and the subscribing organization has not licensed that object.

Corruption: Something goes wrong with the upgrade process, leaving the subscribing organization in an invalid state.

In certain aspects these problems are addressed as follows. To address Collisions, in certain aspects, entities for which the name conflict problem exists are enhanced to support namespaces as will be described in more detail below. For these entities, the name/label/etc will have to be unique only within a namespace. Local customizations and installed metadata will have distinct namespaces, as will metadata from different developers. In some cases the uniqueness requirement may be removed entirely. To address divergent changes, in certain aspects, a developer may mark a package as 'managed' on initial publication to the directory as will be described more below. To be upgradeable, a package must be managed. In general, managed metadata cannot be modified outside of the source organization, although there may be certain well-defined exceptions. To address destructive changes, in certain aspects, developers are not allowed to upload an upgrade which makes destructive changes.

To address resource limitations, in certain aspects, an upgrading subscriber may receive an error due to a resource limitation. Because upgrades are typically manual rather than automatic, the subscriber can address the error (by deleting unused metadata, upgrading to a different edition, etc.) and try again. This approach will not work with automatic upgrades. Therefore, in certain aspects, all resource limits are removed such that no work is required to prevent upgrade failures due to resource exhaustion. To address permissions issues, in certain aspects, as with resource limitations, an upgrading subscriber may receive an error due to an unsatisfied permissions requirement. The subscriber must address the problem and try again. To address corruption, in certain aspects, the upgrade process maintains a progress log, and uses this information to restart the upgrade if a recoverable error occurs.

Metadata Robustness

Another major goal is to allow developers to lock portions of their packages to prevent\subscriber organizations from making breaking changes. Because installed metadata is typically treated no differently from locally created metadata, a subscriber can change various controls, rename objects and fields, and generally adversely impact the subscriber's organization. A second aspect of meta data robustness is protecting intellectual property. Developers may want to prevent subscribers from viewing the internal implementation details of some components, such as SControls and Field Formulas.

In certain aspects, directory upgrades are not automatically distributed to subscribing organizations. Instead, the process requires that a subscriber pull the upgrade to their organization. In certain aspect this includes the developer uploading the new version to the directory, notifying subscribers via an administration VI, email, and/or a visual cue in the Package VI., and manually initiating the upgrade by subscribers.

Some developers may want to convert their existing packages from unmanaged to managed. The state of such installed packages in each subscribing organization is unknown: subscribers could have made any sort of change to the original package content. In certain aspects, a subscriber will the following options:

1) Continue on the unmanaged path, with local customizations and extensions and

2) Manually restore the package to its original state. The restoration process should not be automated because there may be other local customizations that depend upon the modified package state. These customizations may have to be reimplemented.

In certain aspects, tools are included to help subscribers identify and reconcile changes between the package in their organization, and the original package state. In one aspect, a developer process for converting a package from managed to unmanaged includes flagging the package as 'managed', resolving any errors, such as namespacing custom objects and fields in the package, and publish the package to the directory.

Custom Fields on Standard Objects

In certain aspects, developers can package custom objects and all of their fields formulas, validations, etc. However, custom fields on standard objects should not be packaged in certain aspects. In certain aspects, developers are able to package individual custom fields on standard objects. This enhancement is closely related to support for publishing extensions to another developer's package: custom fields on a standard object will behave similarly to custom fields on another developer's custom object. In one aspect,=custom fields are handled as follows:

Custom Fields are automatically (and invisibly to the user) added to the package for all Custom Objects.

Custom Fields on Standard Objects are added individually by the user. A list of Custom Fields would only show Custom Fields for Standard Objects (and for imported and managed Custom Objects, see below).

Custom Objects imported via managed packages are handled identical to Standard Objects with respect to Custom Field packaging.

Dependency Tracking

In one aspect, dependencies are distinguished. For example, in one aspect, dependencies are identified as "highlevel" and "lowlevel" dependencies. "Lowlevel" dependencies are automatically derived dependencies that are added to a package before export and the dependencies are invisible to the user. "Highlevel" dependencies are also added automatically but at the time when the dependent object is added and visibly to the user. This requires that handling of a custom field dependency is treated differently depending on how the dependency was added. In one aspect, locally created Custom Objects are handled as "lowlevel" dependencies. Individually added Custom Formula Fields may introduce additional dependencies. These dependencies are added as "highlevellt dependencies to the package, i.e., the user is able to review the package contents before the final export. In certain aspects, the same holdss true for other components. For example validation formulas will follow the same rules. All validations are added for a custom object ("lowlevel"), but may be individually added for standard (and imported and managed) Objects ("highlevellt). In general, formulas (e.g., Validations, Custom Formula Fields, Field Update Formulas, and Default Value Formulas) may contain references to Custom Fields on external object as well (for example User). These Custom Fields are automatically added to the package as "highlevel" dependencies. Technically this implies that Custom Fields on Custom Objects are added by the "Derived Object" logic that is performed at package export time. Custom Fields on Standard Object are handled by the dependencies spider process, both when a dependent object is added to a package and upon export validation of the package.

In one aspect, workflow rules, approvals, and workflow actions are managed and are exported as inactive. The subscriber may not change the active flag. All workflow items should be considered as templates that the subscriber may clone, e.g., rules, approvals, and actions, and customize to local needs.

Package Dependencies

In certain aspects, custom objects are treated as atomic units for the purposes of packaging: including a custom object in a package automatically includes all fields, formulas, record types, etc. The code does not analyze dependencies below the object level, because it does not have to. In certain aspects, an organization is able to package one or more fields on a standard object. In another aspect, an organization is able to package fields, formulas, record types, validations, etc. on custom objects from other developers. Currently custom objects can be added to packages only in their entirety. All custom fields, formulas, record types, etc, are implicitly added to the package. This feature allows a package maintainer to select individual custom fields (on both custom and standard objects) to be included in a package. Any custom fields that are referenced by other object wide properties will automatically be included in the package.

According to one aspect, object properties that should be scanned for references 10 include:
1. Validation Formulas
2. Custom Field Formulas
3. Custom Links
4. Mail Merge
5. Workflow Rules and Actions Formulas (e.g., Formula Fields, Defaults, Validations) may also reference fields on external entities (e.g., User, RecordType, etc). If these references point to custom fields, those fields are automatically included into the package in one aspect.

If the number of custom fields per entity is limited, allowing to package fields on standard objects (or as extensions on custom objects) might rapidly exhaust the supply of custom fields at the installing organization. In certain aspects, at package export time, the user will be presented with a list of components that were automatically added to the package, hence custom objects will not be added without a conscious decision.

Since it is now possible to add "partial" objects to a package, the UI in certain aspects is changed as follows:
1. Custom Fields are added to the list of high-level components that can be manually selected to be added to a package.
2. Custom Objects are a high level choice of components to add to a package. A manually added custom object automatically causes all its custom fields, validations, record types, etc. to be added to the project.
3. Custom Objects referenced by manually added Custom Fields are automatically added as part of the spidering process at package export time.
4. The same logic applies to Custom Validations: A manual choice to add validations, referred objects are automatically included and all validations are included for
5 manually added custom objects.

Package Versioning

In certain aspects, a developer can create a package, upload that package to the application directory, make arbitrary changes to the package contents, and upload it to the directory again. The directory has no knowledge that a relationship exists between the two uploads, or what that relationship may entail. To support upgrades, certain aspects introduce package versioning. In one aspect, a package includes a sequence of versions, each of which includes a set of component references. An "Upload to Directory" button will move to the version. When the developer uploads a package version, the content of that version will no longer be editable: the developer will be able to look at what is in the package version, but will not be able to add or remove members. To make changes to the package, the developer will create a new version, and add the new items there. When the developer uploads the new version to the directory, subscribers are notified that an upgrade to the package is available. Each uploaded package version will correspond to a new container organization, which will include the metadata for that version and all preceding versions. A container organization in certain aspects, is a separate organization that only contains the contents of a package. All versions of the package will have the same version-invariant package identifier. Additionally, this identifier will be stable across organizations (the developer's organization, repository container organizations, and subscribing organizations) and across instances.

It is possible that during the development of the next major version of a package, the developer will need to release a patch to the current production version. To create the patch/minor version, the developer will create a new package version, place the new version between the current production version and the in-development major version, add items to the new version, and upload the patch to the directory. Subscribers will be notified of the available upgrade. Once a version has been uploaded, a new version cannot be created with a lower sequence number (i.e., once version 2 has been created, the developer cannot create a version between versions 1 and 2).

Because upgrades should be additive, any items added to the intervening minor version are automatically included in the next major version as well. When the developer uploads the minor version, any items that are duplicated in the in-development version will be removed, so that the list of items for a specific version includes just those items added in that version. The versioning functionality is independent of whether a package is managed or not. A developer could upload a new version of an unmanaged package. Although subscribers would not automatically be notified of the new version, and would not be able to upgrade, the directory can use the information to determine that the old version has been superseded. In one aspect, the new version is presented by default, but users can still see old versions. In another aspect, the old versions are not accessible at all.

Namespaces

The name of a component installed as part of an installed package could collide with the name of an existing component in the organization, and hence prevent the installation (this is true for managed and unmanaged packages). This collision can also occur at upgrade time: in the new version of a package, the developer may add a component with the same name as a custom object in one of the subscribing organizations. A namespace is an additional qualifier that increases the alternate index (non-id) uniqueness of a component. For example, if each custom entity in an organization must have a unique name, adding a namespace relaxes the uniqueness constraint on the name, and allows custom entities in the same organization but different namespaces to have the same name. The namespace may qualify fields other than the component name, e.g., the label, description, subject, etc. The namespaced field set is specific to each entity. To upload managed packages, a developer first enables namespacing. As part of this process, the developer's development organization will receive a unique namespace id and prefix. The developer may then update existing namespace-enabled components created in that organization.

Enabling namespacing for the organization will not impact existing namespacedenabled components: components created prior to obtaining a namespace will remain in the global namespace. A VI is provided, in one aspect, to allow a user to view namespaceenabled components in the global namespace, and to move those components into the organization namespace in bulk. New namespace-enabled components will default to the organization namespace, but can be moved to the global namespace. The namespace cannot be changed once the component has been uploaded in a managed package. The publication and installation processes preserve the namespace information. No two developers can create components in the same namespace, nor can the subscribing organization create components in a developer's namespace. This restriction eliminates the possibility for collisions at installation and upgrade.

Organizations that do not enable namespacing will continue to use the global namespace. Namespacing is separate from managed metadata. Managed metadata with unique alternate indexes must be namespaced, but the converse is not true: unmanaged metadata may also be namespaced. Unmanaged metadata uses whatever namespace is inplace for the organization.

In one embodiment, the schema for each namespace-enabled entity is altered to include a namespace identifier, e.g., namespace_id, column. If uniqueness constraints are enforced at the database level, any alternate unique indexes can be altered to include the namespace_id column. In certain aspects, the indexes are not modified at the database level (for example, in certain aspects, there is one table for all customers); they include namespace as a column but the column is null if the entity doesn't have a namespace. If uniqueness constraints are enforced in Java, the code should be updated to allow the same name across namespaces. In one aspect, the namespace identifier include a value with a scope that is at least unique per developer organization. The namespace information, in certain aspects, should not be used for anything but making the namespaced field combinations unique. The 20 UI will use the package membership information to visually distinguish installed and local components of the same name.

In addition to the changes to each namespace-enabled entity, an additional change for managing namespaces at the organization level include adding a new Namespace entity and corresponding table to manage the namespace information: the namespace id, the id of the organization that owns the namespace, and the namespace prefix. in one aspect, the namespace id is automatically unique across all organizations. The namespace prefix must also be unique across all organizations.

Although the developer organization id and the namespace id will be coincident in subscribing organizations, the organization id should not be used as the namespace id. In some extreme situations, it may be necessary to manually transfer ownership of the namespace to another organization. Using the namespace id rather than the developer organization id minimizes the impact of this change.

Managed Metadata

In certain aspects, managed metadata includes two types of information: static information, and dynamic information based on package membership.

1. Managed Packages

In certain aspects, a package entity, e.g., application, includes a boolean 'isManaged' field. If the developer marks a package as managed, i.e., sets the boolean field appropriately, the package becomes upgradeable. Once the package has been uploaded, the 'isManaged' field cannot be turned off, or reset, and the developer cannot make destructive changes to the package contents.

2. Managed Components

In a developer/publisher organization, a component is managed if it is part of at least one managed package which has been uploaded to the application directory. In a subscribing organization, a component is managed if it is part of an installed managed package. In a developer/publisher organization, when a component changes from unmanaged to managed (either because the developer has added the component to a managed package, or because the developer has changed the package from unmanaged to managed), the system will enforce additional instance requirements. These requirements need to be satisfied prior to upload. These manageability requirements vary by type. The most common instance requirement for manageability is namespacing. Once a managed component has been uploaded (or, for the subscribing organization, installed from the directory), the framework restricts the changes that the user can make to that component. These restrictions guarantee that the package can be upgraded without conflicts and without breaking dependent functionality. The specific restrictions depend on the entity type, and also vary between the developer's organization and subscribing organizations.

Manageable State

The manageable state of a component will be determined via a secondary query to one or more of the package, version, and member tables. An example query might look like the following:

```
SELECT
    CASE
        WHEN p.source_id = <organization id> AND v.is_uploaded = 'I'
        THEN
eManageableState.MANAGED _PUBLISHED
        WHEN p.source_id = <organization id> AND v.is_uploaded IS
        NULL THEN
eManageableState.MANAGED _NOT_PUBLISHED
        WHEN p.source_id <> <organization id> THEN
eManageableState.MANAGED _ INSTALLED
        ELSE eManageableState. UNMANAGED
        END AS manageable_state
    FROM core. project_member m, core.project p
    LEFT OUTER JOIN core. package_version v
        ON v.organization _ id = <organization id>
        AND v.package_definition_id = p.project_id
        AND v.package_ version_id = m.added_ version_id
        AND v.is_uploaded = 'I'
    WHERE p.organization_id = <organization id>
        AND p.is_managed = '1'
        AND m.organization _id = <organization id>
        AND m.project_id = p.project_id
        AND m.subject_id = <component id>
```

In certain aspects, the manageable state will be exposed in Java (e.g., using a data dictionary and related controller code) as an enum with the following values: managed-uploaded: the component is managed and owned by this organization (ie this is the publishing organization). managed-not-uploaded: the component is owned by this organization and is in a managed package, but has not been uploaded. managed-installed: the component is managed and owned by another organization (Le., the component is part of a managed package installed from the directory). unmanaged: the component is unmanaged.

In the developer/publishing organization, setup must be changed to prevent the developer from uploading an upgrade that could break the functionality of the package. Examples of breaking changes include: deleting any managed component, especially a custom object or custom field, and changing the API name of a custom object or custom field. The restrictions are enforced, in certain aspects, when the developer attempts to upload the upgraded package version. In one aspect, the restrictions are enforced within each entity VI so that the developer never makes the invalid changes (especially since some changes may be difficult or impossible to revert).

In the subscribing organization, setup must be changed to prevent the subscriber from making changes to managed components that could cause conflicts with local customizations, new packages, and upgrades to existing packages. Additionally, setup should prevent the subscriber from making changes that could break the functionality of the package, such as external integrations. In one aspect, these restrictions are enforced in each entity VI via display changes (separating local customizations and published content, disabling links and buttons, etc.) and error messages.

Certain enhancements to the entity and entity-field information described below provide the information necessary to implement these restrictions. In one aspect, each entity includes an attribute, with the following possible values:

packageable: the entity is packageable, but not upgradeable.

manageable: the entity is packageable, and may be upgraded in a managed package.

immutable: the entity is packageable, and may be upgraded in a managed package; however neither the developer nor subscribers can change any non-internal fields.

not specified: the entity is not packageable.

Additionally, in one aspect, for each manageable entity, each attribute will include an attribute that determines what changes if any can be made to that field if the component is managed. Categories of field manageability according to one aspect include:

Subscriber-controlled: the installation process sets the field to the default value specified in the data dictionary. The subscriber may change the value locally. The upgrade process ignores the field, and preserves any subscriber changes.

Overrideable: the developer specifies an initial value, and may modify the value in an upgrade. The subscriber may also change the value locally, and may revert to the most recent published value at any time.

Publisher-controlled: the developer specifies the value, and may modify the value in an upgrade. The subscribing organization cannot modify or override the value.

Immutable: once uploaded, neither the developer nor the subscribing organization can modify the value.

Internal: the field is system-controlled. Neither the developer nor the subscriber can explicitly change the value. It may be set either at installation or as part of usage.

Compound: the field includes multiple columns or flags, with a combination of different manageabilities.

For bit vector fields, manageability may be specified either for the field as a whole, or for each bit vector item. The attribute for bit vector fields and items can be subscribercontrolled, publisher-controlled, immutable, or internal, as described above. Bit vector items and fields should not be override able, because, in certain aspects, the overrideable behavior requires ternary logic (truelfalseldefault). If each bit vector item specifies its manageability, the field manageability is compound. Multi-column fields can be handled in a similar fashion. Unlike bit vector fields, overrideable columns or multi-column fields are feasible.

Overrideable fields allow the subscribing organization to make changes to field values while retaining the original published values. Upgrades from the subscriber will update the published values but should not change any overridden values. The subscriber can revert back to the latest published value. Ij certain aspects, overrideable fields can be stored in a general override table, in extra columns in a base table, or in an entity specific override table, in an override entity.

In certain aspects, if an entity has an attribute value of packageable, all of its fields are automatically subscriber-controlled, and if an entity has an attribute value of immutable, all of its fields are automatically immutable. In certain aspects, a foreign key field to an unmanageable entity is automatically subscriber-controlled. Further, if the foreign key domain is not packageable, the value is automatically set to the empty key on upload. In certain aspects, the unique id field for an entity is automatically immutable, and if an entity has an attribute value of manageable, its fields default to publisher-controlled.

As mentioned above, the setup area should behave differently for managed components. Distinct behavioral groupings include: locally-created components that are a part of at least one managed, uploaded package; managed components installed from the directory; and local customizations, not-yet-uploaded components, and unmanaged components from other developers. In certain aspects, the attributes of an entity will control the behavioral details. However, in order for the UI to determine how a particular component should behave, it should first obtain package membership information for the component, including, for example, the packages containing the component, whether any of the packages are marked as 'managed', if the package is managed, whether the current organization owns the package, and if the current organization owns the managed package, whether the package has been uploaded.

Promoting an entity from unmanageable to manageable presents an interesting problem. Developers may have released unmanaged instances of the entity in managed packages, and these components (as is the case with any unmanaged component) may have been modified in subscribing organizations. The developer must either convert the components to managed, or remove them from the package in the next version. If the developer converts the components to managed, the subscriber will have to abandon or reimplement their changes. To avoid this problem, newly packageable entities should not be released with an initial attribute value of unmanageable if the eventual goal is to have them be manageable. Instead, the new entity should be immutable. Managed instances of immutable entities cannot be modified by either the developer or subscribers. This restriction includes changing the component lifecycle status to 'deployed', activating the component, etc. To use the component, subscribers should create a clone. Because the developer cannot modify the component, the upgrade process for the entity should be easier to implement. Because the subscriber cannot modify the component, when the entity ultimately changes from immutable to manageable, there cannot be any conflicts.

A similar problem exists with regard to field manageability_A change from anything less restrictive than publisher-controlled to publisher-controlled or a more restrictive level would result in the loss of any subscriber changes. Increasing the permissiveness is=acceptable, as is subscriber-controlled to overrideable.

Resource Limitations

Resource limitations such as the maximum number of custom objects for the organization, the maximum number of custom fields per object, etc. can cause problems at upgrade time, because the developer may have added more components than a subscriber has remaining. Because the upgrade model in certain aspects is pull rather than push, there is no need to address this problem. If an upgrade fails due to a resource limitation, the subscriber can delete other components or move to the next edition, and try the upgrade again. Additionally, in certain aspects subscribers may have the option of remaining on an unmanaged version of the package. Limits serve multiple purposes, roughly defined by the following categories. A particular limit may serve multiple purposes.

Complexity: the limit exists because removing it would be significantly more complex to implement, often because of a similar limitation in an underlying system.

Performance: allowing the organization to exceed the limit would degrade runtime performance.

Usability: allowing the organization to exceed the limit would make the application confusing, or unwieldy.

Business: the limit exists as a differentiator between editions or products, as incentive to upgrade.

One option is to lift all resource limitation, and allow an organization to exceed other limits via directory upgrades (and possibly installs). If this is not feasible, preallocation may be implemented.

Upgrade Mechanism

To make an upgrade available, in one aspect, some or all of the following actions may occur:

When the upload of the previous package version completes, the system automatically creates a new version with an appropriate internal version sequence identifier.

The developer either modifies previously uploaded components, adds new components, or both. The developer interacts with the package. Internally, the system associates these changes with the new version.

The developer initiates the upload of the new version to the directory via a wizard.

During the upload process, the developer may provide a descriptive version label, in addition to the internal sequence identifier.

As part of the upload process, the system runs a spidering algorithm to find any new dependencies and verify referential integrity. The system also verifies that all new components adhere to the requirements for manageability, and that all modified components adhere to the requirements for upgrade. To complete the upload, the developer may need to resolve any validation errors.

Prior to completing the upload, the developer may add or remove new components.

If the developer has modified a component since the previous version was uploaded, the system will update the package_version_id for the component to the id of the version being uploaded. Because each upload includes components in the current version and all previous versions, and because the previous version of a modified component no longer exists in the publishing organization, the developer cannot control whether modifications to a previously uploaded component are included in the next version.

Upgrading an Organization

In certain aspects, the upgrade process performs some or all of the following steps:

Prior to modifying any data in the organization, check for any issues requiring human intervention, such as resource limitations, organization permissions, etc. If such issues exist, the user is informed and the upgrade is failed/terminated.

Pre-load project membership and id mapping information.

Iterate over the project content, and process each member appropriately, according to its manageability and whether the component exists in the subscribing organization.

For managed components, the package version information can be used to determine whether a particular component exists in the subscribing organization. If the subscribing organization has version N of the package, it should have all components in version N and previous versions. The set of new components for version M would then be those components added in versions N+1 to version M. However, in one aspect, for simplicity and robustness, the upgrade process determines whether a component exists by looking in the subscribing organization.

In certain aspects, new managed components are inserted, with fields initialized as follows:

publisher-controlled fields are set to the published value.

subscriber-controlled fields are set to the default value specified in the data dictionary.

overrideable fields are set to the published value in the base table.

immutable fields are set to the published value.

internal fields are ignored by the upgrade process, but may be set indirectly via internal logic.

In certain aspects, existing managed components are updated according to the fieldlevel manageability for the entity as follows:

publisher-controlled fields are updated unconditionally.

subscriber-controlled fields are ignored.

overrideable fields are updated in the base table. Subscriber changes will be preserved in the override table.

immutable fields are ignored.

internal fields are ignored by the upgrade process, but may be modified indirectly via internal logic.

If the entity manageability attribute is set to packageable or immutable, the upgrade process ignores the entire component.

U.S. patent application Ser. No. 11/530,394 filed Sep. 8, 2006, which is incorporated by reference herein, discloses additional aspects and features regarding application package creation and exporting.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for upgrading application packages installed to an application platform and managed by an on-demand database service, comprising:

storing an uploaded application package at a directory that is accessible by a plurality of subscribers, the application package being created by a developer and including a set of metadata components;

wherein application packages subject to a name conflict are enhanced with explicit namespace declarations;

responsive to receiving from a first subscriber a selection of the application package, installing the application package to the first subscriber on an application platform of the on-demand database service;

receiving, from the developer, a new version of the uploaded application package at the directory;

enforcing restrictions on modification of software entities in the new version of the uploaded application package, wherein the restrictions prevent the developer from making invalid changes to custom field types and API names of the uploaded application package;

storing the new version, wherein the stored new version includes a) any new metadata component or components relative to a prior version, b) any changes to a metadata component of a prior version;

informing the first subscriber of the new version of the application package; and responsive to receiving from the first subscriber a selection of the new version, installing the new version to the first subscriber.

2. The method of claim 1, wherein the selection of the new version is received from the first subscriber, and wherein installing the new version includes installing the new metadata component or components and/or any changes to a metadata component of the prior version.

3. The method of claim 1, wherein the selection of the new version is received from a second subscriber, and wherein installing the new version includes installing the metadata components of the prior version of the application package and the new metadata component or components and/or any changes to a metadata component of the prior version.

4. The method of claim 1, wherein the set of metadata components includes one or more of a standard object, a custom objects, a custom field, code or a formula.

5. The method of claim 1, wherein if the developer indicated that a metadata component in a uploaded package is a component that cannot be modified, not applying any changes attempted to be made to that metadata component by a subscriber or the developer.

6. The method of claim 1, wherein if the developer indicated that a metadata component in a uploaded package is a component is modifiable, allowing the subscriber to modify that component in the installed package.

7. The method of claim 1, wherein the application package is marked as managed, further including restricting modification of the application package metadata objects, fields, code, or formulas based on package management restrictions.

8. The method of claim 1, wherein the application package contains code and metadata used to identify resource requirements for the installation of the application package, before installing the application package to the first subscriber, verifying that the resource requirements are met.

9. A non-transitory computer-readable medium storing computer code for controlling one or more processor components to manage installation and upgrading of application packages to an application platform in an on-demand database service, the code including instructions to:
include in application packages subject to a name conflict an enhancement including explicit namespace declarations;
store an uploaded application package at a directory that is accessible by a plurality of subscribers, the application package being created by a developer and including a set of metadata components;
responsive to receiving from a first subscriber a selection of the application package, install the application package to the first subscriber on an application platform of the on-demand database service;
enforce restrictions on modification of software entities in the new version of the uploaded application package, wherein the restrictions prevent the developer from making invalid changes to custom field types and API names of the uploaded application package;
responsive to receiving from the developer a new version of the uploaded application package, store the new version to the directory, wherein the stored new version includes a) any new metadata component or components relative to a prior version and b) any changes to a metadata component of a prior version;
automatically inform the first subscriber of the new version of the application package; and
responsive to receiving from a subscriber a selection of the new version, install the new version to that subscriber.

10. The non-transitory computer-readable medium of claim 9, wherein the selection of the new version is received from the first subscriber, and wherein the instructions to install the new version includes instructions to install the new metadata component or components and/or any changes to a metadata component of the prior version.

11. The non-transitory computer-readable medium of claim 9, wherein the selection of the new version is received from a second subscriber, and wherein the instructions to install the new version includes instructions to install the metadata components of the prior version of the application package and the new metadata component or components and/or any changes to a metadata component of the prior version.

12. The non-transitory computer-readable medium of claim 9, wherein the set of metadata components includes one or more of a standard object, a custom objects, a custom field, code or a formula.

13. The non-transitory computer-readable medium of claim 9, wherein the code further includes instructions to not apply any changes attempted to be made to a metadata component by a subscriber or the developer if the developer had indicated that that metadata component in the uploaded package is a component that cannot be modified.

14. The non-transitory computer-readable medium of claim 9, wherein the code further includes instructions to allow the subscriber to modify a component in the installed package if the developer had indicated in the uploaded package that that metadata component is a component that is modifiable.

15. The non-transitory computer-readable medium of claim 9, wherein the application package is marked as managed, further including restricting modification of the application package metadata objects, fields, code, or formulas based on package management restrictions.

16. The non-transitory computer-readable medium of claim 9, wherein the application package contains code and metadata used to identify resource requirements for the installation of the application package, before installing the application package to the first subscriber, verifying that the resource requirements are met.

17. A system for managing installation and upgrades of application packages installed to an application platform in an on-demand database service; the system comprising:
a database system for storing metadata components; and
one or more processors configured to:
include in application packages subject to a name conflict an enhancement including explicit namespace declarations;
store an uploaded application package to a directory portion of the database that is accessible by a plurality of subscribers, the application package including a set of metadata components created and uploaded to the directory by a developer;
responsive to receiving from a first subscriber a selection of the application package, install the application package to the first subscriber on an application platform of the on-demand database service;
enforce restrictions on modification of software entities in the new version of the uploaded application package, wherein the restrictions prevent the developer from making invalid changes to custom field types and API names of the uploaded application package;
responsive to receiving from the developer a new version of the uploaded application package, store the new version to the directory, wherein the stored new version includes a) any new metadata component or components relative to a prior version and b) any changes to a metadata component of a prior version;
automatically inform the first subscriber of the new version of the application package; and
responsive to receiving from a subscriber a selection of the new version, install the new version to that subscriber.

18. The system of claim 17, wherein if the selection of the new version is received from the first subscriber, installation of the new version includes an install of the new metadata component or components and/or any changes to a metadata component of the prior version, and wherein if the selection of the new version is received from a second subscriber, installation of the new version includes an install of the metadata components of the prior version of the application package and the new metadata component or components and/or any changes to a metadata component of the prior version.

19. The system of claim 17, wherein the application package is marked as managed, further including restricting modification of the application package metadata objects, fields, code, or formulas based on package management restrictions.

20. The system of claim 17, wherein the application package contains code and metadata used to identify resource requirements for the installation of the application package, before installing the application package to the first subscriber, verifying that the resource requirements are met.

* * * * *